(12) United States Patent
Falkenstein

(10) Patent No.: US 8,352,106 B2
(45) Date of Patent: Jan. 8, 2013

(54) METHOD FOR OPERATING A HYBRID VEHICLE

(75) Inventor: Jens-Werner Falkenstein, Aalen (DE)

(73) Assignee: Robert Bosch GmbH, Stuttgart (DE)

( * ) Notice: Subject to any disclaimer, the term of this patent is extended or adjusted under 35 U.S.C. 154(b) by 565 days.

(21) Appl. No.: 12/085,265

(22) PCT Filed: Nov. 30, 2006

(86) PCT No.: PCT/EP2006/069130
§ 371 (c)(1),
(2), (4) Date: Jul. 6, 2010

(87) PCT Pub. No.: WO2007/074019
PCT Pub. Date: Jul. 5, 2007

(65) Prior Publication Data
US 2010/0274421 A1    Oct. 28, 2010

(30) Foreign Application Priority Data
Dec. 22, 2005    (DE) .......................... 10 2005 061 414

(51) Int. Cl.
*B60L 9/00*    (2006.01)
*B60L 11/00*   (2006.01)
*G05D 1/00*    (2006.01)
*G05D 3/00*    (2006.01)
*G06F 7/00*    (2006.01)
*G06F 17/00*   (2006.01)

(52) U.S. Cl. .................. 701/22; 180/65.265; 180/65.28; 180/65.285

(58) Field of Classification Search ................ 701/22; 180/65.265, 65.28, 65.285
See application file for complete search history.

(56) References Cited

U.S. PATENT DOCUMENTS

| | | | |
|---|---|---|---|
| 7,971,665 B2 * | 7/2011 | Tumback et al. | .......... 180/65.21 |
| 2002/0024306 A1 | 2/2002 | Imai et al. | |
| 2002/0113440 A1 | 8/2002 | Kimura et al. | |
| 2003/0006094 A1 | 1/2003 | Cole | |
| 2004/0122563 A1 | 6/2004 | Okada et al. | |

FOREIGN PATENT DOCUMENTS

| | | |
|---|---|---|
| EP | 1 149 725 | 10/2001 |
| EP | 1 548 253 | 6/2005 |
| FR | 2 783 763 | 3/2000 |
| WO | WO 2005/009770 | 2/2005 |

* cited by examiner

*Primary Examiner* — Prasad Gokhale
(74) *Attorney, Agent, or Firm* — Kenyon & Kenyon LLP

(57) ABSTRACT

In a method for operating a power-branching hybrid drive having at least one first and one second electric machine coupled via a transmission, as well as having an internal combustion engine which outputs a torque $M_{VM}$, the electric machines and the internal combustion engine acting together, having their drives connected, the first electric machine is rotation speed-regulated, the second electric machine is torque-controlled, and the internal combustion engine is operated in a rotation speed-regulated manner.

19 Claims, 2 Drawing Sheets

METHOD FOR OPERATING A HYBRID VEHICLE

BACKGROUND OF THE INVENTION

1. Field of the Invention

The present invention relates to a method for operating a hybrid vehicle.

2. Description of Related Art

An electromagnetic power-branching hybrid drive having at least two units, one internal combustion engine and one electric machine, are known and permit operating the internal combustion engine in a high efficiency range.

The driving power of the internal combustion engine is divided up into a power component, using one or more mechanical override transmissions (planetary transmissions), which becomes a drive purely mechanically, and therefore at high efficiency. The remaining power is converted into electric power via a regeneratively functioning electrical machine, and is mostly fed back into the transmission by a second motor-type electric machine.

Because of the override properties of the planetary transmission, while ignoring elasticities, there is typically one rotational speed degree of freedom available. Thus, at a specified vehicle speed and a specified gear, if several gears may be selected, the rotational speed may be freely selected within physical limits. Transmission constructions are known in which the rotational speed of the second electric machine depends directly on the vehicle speed. In other concepts, this is the case at least in one of several gears. In response to changes in the rotational speed degree of freedom, that is, in the rotational speed of the internal combustion engine, there comes about a change in rotational speed at the first electric machine, but the rotational speed of the second electric machine remains constant with the vehicle speed.

In hybrid operation, the available rotational speed degree of freedom is used to operate the power train in the range of high overall efficiencies. A control system takes into account essentially the vehicle speed and the actual rotational speed of the transmission output shaft, the tractive force requested by the driver and the power required to supply the vehicle electrical system, and based on these, it determines the rotational speed degree of freedom available, as well as the torques of the units.

In the known attempts to regulate such a power train having one rotational speed degree of freedom, only one unit, usually one of the two electric machines, is operated with its rotational speed regulated, that is, a comparison of the setpoint rotational speed to the actual rotational speed takes place for only one unit.

The two other units, the second electric machine and the internal combustion engine, are torque-controlled, partially as a function of the rotational speed deviation at the rotational speed-regulated unit.

In published U.S. patent application documents US 2002/0113440 A1 and US 2003/006094 A1, in each case one of the two electric machines is rotational speed-regulated. A setpoint rotational speed of the internal combustion engine is calculated which, together with the vehicle speed, is used to ascertain the setpoint rotational speed for one of the two electric machines, which is then rotational speed-regulated by comparison of its setpoint rotational speed to its actual rotational speed.

Published U.S. patent application document US 2002/0024306 A1 proposes only regulating the rotational speed of the internal combustion engine in the power-branching operation. The setpoint rotational speed of the internal combustion engine is compared to its actual rotational speed, and based on this, an intervention takes place in torques.

BRIEF SUMMARY OF THE INVENTION

According to the present invention, may be prevented that inaccuracies in the torque controls, which are present particularly in the case of an internal combustion engine, and inaccuracies in frictional ratios of the transmission have an effect upon a rotational speed-regulated, first electric machine. A deviation of the torque, set by the rotational speed controller at the electric machine, from the setpoint torque in the controller, is able to be avoided.

The present invention is especially advantageously applied in the case of a transmission construction or at a gear at which the rotational speed of a second electric machine is directly coupled to the vehicle speed. The internal combustion engine rotational speed and the rotational speed of the first electric machine are then functions of the rotational speed degree of freedom and the vehicle speed. These two units that are linked to the rotational speed degree of freedom, especially the first electric machine and the internal combustion engine, are operated in a rotational speed-regulated manner. The rotational speed of the internal combustion engine may, for instance, be taken to be a rotational speed degree of freedom. If it is determined by the controller, the rotational speed of the first electric machine may be calculated from the vehicle speed, with the aid of the coupling conditions of the transmission.

The present invention takes into consideration inaccuracies in the frictional ratios of the transmission and inaccuracies when controlling the torque of the internal combustion engine, and their effects on the electrical power fed into the vehicle electrical system are minimized. Besides that, the danger of losing control of the system by limiting actuating variables is substantially less. Additional advantages are the active damping of undesired power train torsional vibrations. The method according to the present invention may advantageously be integrated into an ordinary control device structure in which each of the three units has a control device associated with it, e.g. an engine control device for the internal combustion engine and a rectifier inverter having a controller for each of the two electric machines, and in which the control devices communicate with one another via a bus connection.

Based on a system deviation between a setpoint rotational speed and an actual rotational speed of the internal combustion engine, preferably an intervention takes place in the torque of the internal combustion engine.

In one favorable method step, the rotational speed of the internal combustion engine is determined, and from that a setpoint rotational speed of the first electric machine is calculated.

In a further favorable method step, setpoint torques of the internal combustion engine and of the electric machines are specified.

In another favorable method step, the setpoint torques of the internal combustion engine and of the first electric machine are used for the precontrol of the rotational speed regulation of the internal combustion engine and of the first electric machine.

Alternatively, the setpoint torques may be ascertained from the setpoint rotational speeds and the actual rotational speed of the internal combustion engine and the first electric machine. For this purpose, a multivariate controller is advantageously used to which the setpoint rotational speeds and the actual rotational speeds are supplied.

In one favorable method step, the setpoint torques lie within maximum torque limits of the internal combustion engine and of the first electric machine. Control reserves for the rotational speed controllers may thereby be made available.

In one favorable method step, each rotational speed controller compares the respective setpoint rotational speed to the respective actual rotational speed, and calculates from it an additional torque for the internal combustion engine and the first electric machine, based on the respective system deviation.

In a further favorable method step, an integral-action component of a controller is utilized for the rotational speed regulation. The integral-action component is able to adjust inaccuracies in the torque control of the internal combustion engine.

In a further favorable method step, a proportional-action component of a controller is utilized for the rotational speed regulation of the first electric machine. A small time constant may thereby be achieved. In addition, the proportional-action components of the controller(s) are able actively to counteract the torsional vibrations of the units. With that, damping at higher frequencies may take place especially advantageously.

DETAILED DESCRIPTION OF THE INVENTION

Figure 1:
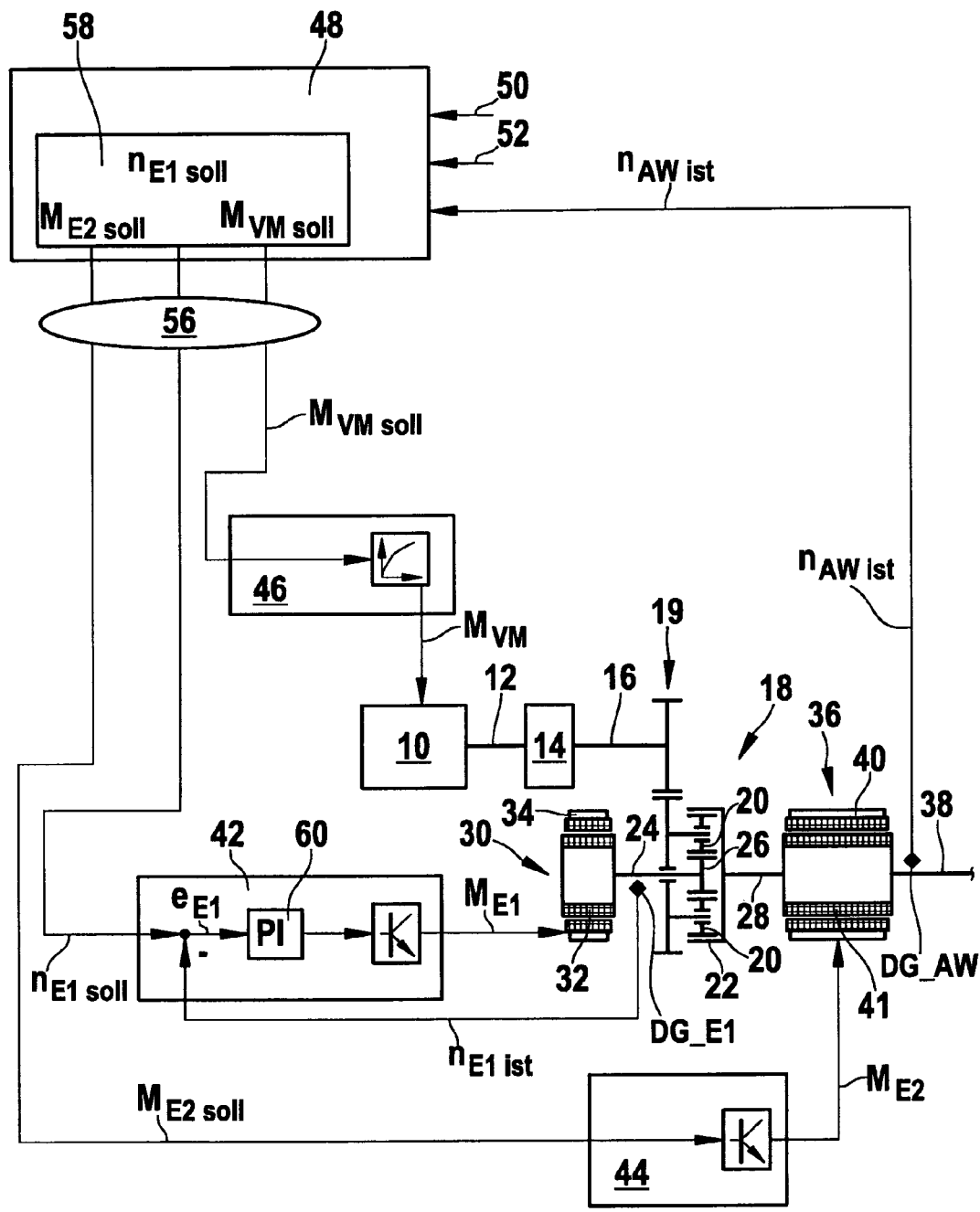
FIG. 1 shows a known regulation strategy of a power-branching hybrid drive control.

For a better understanding of the present invention, FIG. 1 shows a conventional regulating strategy, using the example of a transmission 18 having a planetary gear set 20. As the units, an internal combustion engine 10 and two electric machines 30, 36 are provided. Transmission 18 is situated between the two electric machines 30, 36. Planets 20 roll on a sun gear 26 and are positioned within an internal geared wheel 22. First electric machine 30 lies with its drive shaft 24, that is connected to its rotor 32, on sun wheel 26. A shaft 28 lies on internal geared wheel 22, and drives rotor 41 of second electric machine 36, whose output forms drive shaft 38. The two electric machines 30, 36 are developed as internal-rotor motors whose rotors 32, 41 rotate within their stators 34, 40.

An engine control unit 46 is assigned to internal combustion engine 10, and a rectifier inverter 42, 44 is assigned to each of the electric machines 30, 36, respectively. A speed sensor DG_E1 records the current rotational speed of first electric machine 30 and a speed sensor DG_AW records that of second electric machine 36. In a setpoint value block 58, a control system 48 specifies setpoint rotational speed $n_{E1setpoint}$ of rotational speed-regulated electric machine 30, setpoint torque $M_{E2setpoint}$ of torque-controlled second electric machine 36 and setpoint torque $M_{VMsetpoint}$ of torque-controlled internal combustion engine 10. The control system receives as input variables 50, 52, $n_{AWactual}$, for instance, an accelerator pedal setting as well as a required electrical power for a vehicle electrical system, as well as actual rotational speed $n_{AWactual}$ of a drive shaft 38 of second electric machine 36. Torque $M_{VM}$ influences torque $M_{E1}$, which is set by rotational speed controller 60 of first rectifier inverter 42 at first electric machine 30, or rather specifies as setpoint value for a secondary current control. In the ideal case, torque $M_{E1}$ corresponds to a setpoint torque $M_{E1setpoint}$, that is precalculated in control system 48, for rotational speed-regulated electric machine 30. Inaccuracies in the torque control systems, which exist particularly in the case of internal combustion engine 10, and inaccuracies in the frictional ratios of transmission 18 have an effect on rotational speed-regulated electric machine 30. Torque $M_{E1}$ set by rotational speed controller 60 at first electric machine 30 may therefore deviate considerably from setpoint torque $M_{E1setpoint}$ that is precalculated by control system 48. This has two negative effects. For one, the electrical power of the rotational speed-regulated first electric machine 30 deviates from the setpoint value. The electrical power fed into the vehicle electrical system then does not correspond to the control system's specification, thus negatively affecting the vehicle electrical system. In addition, the power limits of an electrical energy reservoir, that is not shown, can also be exceeded, e.g. in the context of energy recovery during a braking operation or in boost mode. For another thing, the rotational speed-regulated first electric machine 30, because of corresponding inaccuracies, may reach its maximum torque limit, which means a limitation of actuating variables for the speed control loop. The link established with the rotational speed regulation system thereby becomes ineffective. Without further intervention in torque-controlled internal combustion engine 10, the control of the system becomes lost.

In dynamic operation, the torque-controlled units, that is, internal combustion engine 10 and second electric machine 36 may be precontrolled, based on the knowledge of the inertias that have to be compensated for. Additional inaccuracies may nevertheless be expected in this context, with effects on torque $M_{E1}$ of rotational speed-regulated electric machine 30. A bus system 56 transmits the various setpoint values $M_{VMsetpoint}$, $M_{E2setpoint}$ and $n_{E1setpoint}$ for the torque and the rotational speed to engine control unit 46 and rectifier inverters 42, 44.

A dual-mass flywheel 14 and a torsion damper at crankshaft 12 of internal combustion engine 10 is usually required in order to decouple transmission 18 from rotational irregularities of internal combustion engine 10. Using its output shaft 16, dual-mass flywheel 14 drives a crosspiece 19 of planetary gear set 20 of transmission 18. However, as a result of the elasticity, undesired torsional vibrations may be created in the power train. Active vibrational damping is possible in an only limited manner with only one rotational speed-controller 60 of first rectifier inverter 42 of first electric machine 30.

Figure 2:
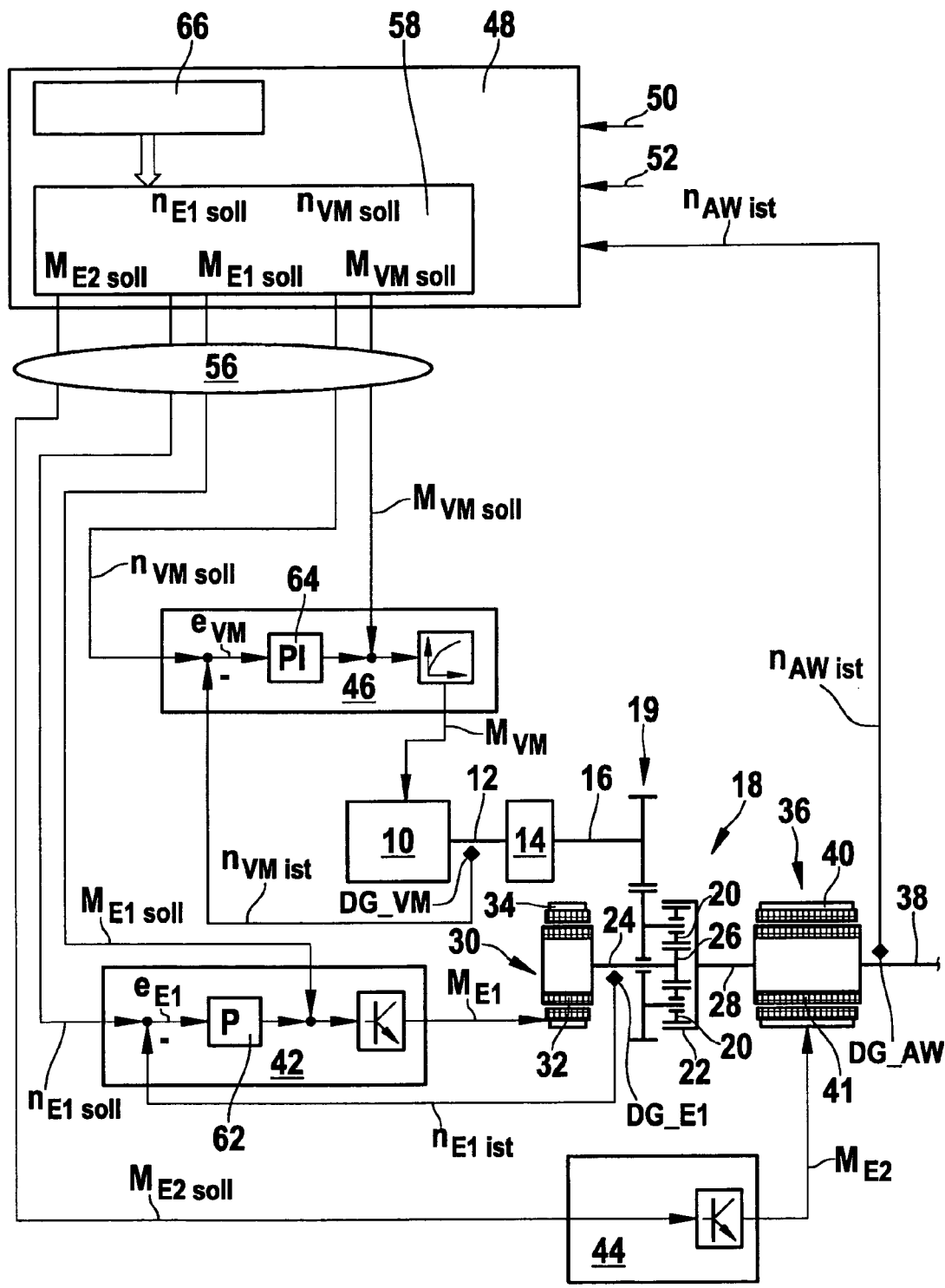
FIG. 2 shows an exemplary embodiment of a regulating strategy, according to the present invention, of a preferred power-branching hybrid control.

FIG. 2 shows an exemplary embodiment for the regulation according to the present invention, having two separate rotational speed controllers 62, 64 on a transmission 18 having a planetary gear set 20.

The arrangement of the components is largely equivalent to that of the ones in FIG. 1, to which we refer for their description. Via dual-mass flywheel 14, internal combustion engine 10 drives crosspiece 19 of planetary gear set 20 of transmission 18. Electric machine 30 is coupled to sun gear 26 of planetary gear set 20, and electric machine 36 to internal geared wheel 22. The output of electric machine 36 forms transmission output shaft 38, which is connected to the drive wheels (not shown) of the hybrid vehicle. A speed sensor DG_E1 records the current rotational speed $n_{E1actual}$ of first rotational speed-regulated electric machine 30, a speed sensor DG_AW records the common rotational speed $n_{AWactual}$ of transmission output shaft 38 and second, torque-controlled electric machine 36, and a speed sensor DG_VM records the current rotational speed $n_{VMactual}$ of internal combustion engine 10.

A control system 48, that is not further described here, receives as input variables 50, 52, $n_{AWactual}$, for instance, the accelerator pedal setting, electric power 52 that is required for the vehicle electrical system and actual rotational speed $n_{AWactual}$ of transmission output shaft 38, which agrees with the actual rotational speed of second electric machine 36 and the vehicle speed ascertained from this.

In setpoint value block 58, control system 48 determines in an optimized way the rotational speed degree of freedom, that is, internal combustion engine rotational speed $n_{VMsetpoint}$, and calculates from it setpoint rotational speed $n_{E1setpoint}$ for first electric machine 30, based on the coupling condition (block 66) of transmission 18 and actual rotational speed $n_{AWactual}$ of transmission output shaft 38. Besides that, control system 48 specifies the setpoint torques $M_{VMsetpoint}$, $M_{E1setpoint}$, $M_{E2setpoint}$ for the three units internal combustion engine 10, first electric machine 30 and second electric machine 36. The coupling condition 66 of the transmission 18 is also taken into account in this instance. Setpoint torques $M_{VMsetpoint}$, $M_{E1setpoint}$, $M_{E2setpoint}$ may include proportions for the compensation of inertias in dynamic operation.

Setpoint torques $M_{VMsetpoint}$ and $M_{E1setpoint}$ are used as precontrols by the two secondary speed control loops, and, within the meaning of a cascading actuating variable restriction, they lie within the maximum torque limits of the respective unit, in order to make available control reserves for rotational speed controllers 62, 64. Rotational speed controller 62 compares setpoint rotational speed $n_{E1setpoint}$ to actual rotational speed $n_{E1actual}$ of first electric machine 30, and rotational speed regulator 64 compares setpoint rotational speed $n_{VMsetpoint}$ to actual rotational speed $n_{VMactual}$ of internal combustion engine 10. Rotational speed regulators 62, 64 calculate additional torques based on system deviations $e_{VM}$ and $e_{E1}$.

An alternative approach is also possible in which a multivariate controller, that is not shown pictorially, to which the setpoint rotational speeds $n_{VMsetpoint}$, $n_{E1setpoint}$ and the actual rotational speeds $n_{VMactual}$, $n_{E1actual}$ are supplied, and which ascertains torques for the units, based on this.

In modern electric machines 30, 36, a specified setpoint torque is implemented sufficiently accurately. In internal combustion engine 10, mostly greater deviations are created between the setpoint torque and the actual torque produced at crankshaft 12. That is why it is advantageous to provide an integral-action component for controller 64 of the speed control loop of internal combustion engine 10, for example, an integral regulator, a proportional regulator, an integral or proportional integral differential regulator (an I regulator, PI regulator or PID regulator), whereas rotational speed regulator 62 of the electric machine is preferably developed as a proportional regulator or a proportional-differential regulator (P regulator or PD regulator).

The integral-action component adjusts inaccuracies in the torque control of internal combustion engine 10, and inaccuracies in the frictional ratios of transmission 18. In stationary operation, actual rotational speed $n_{VMactual}$ of internal combustion engine 10 will approach setpoint rotational speed $n_{VMsetpoint}$ asymptotically. That being the case, systems deviation $e_{E1}$ at first electric machine 30 also tends to zero. First electric machine 30 then approximately sets setpoint torque ($M_{E1} \approx M_{E1setpoint}$). Second electric machine 36 is operated torque-controlled, and approximately sets the setpoint torque, with $M_{E2}=M_{E2setpoint}$. Using the setpoint torques specified by control system 48, the specification for the electric power fed into the vehicle electrical system is also maintained, even in response to inaccuracies in the frictional ratios of transmission 18.

Because the two units internal combustion engine 10 and first electric machine 30 are operated in rotational speed-regulated fashion, one of them can become actuating-variable limited without causing control over the system to be lost. If, as a result of an overvoltage limiting control or an undervoltage limiting control electric machine 30 gets into actuating variable limitation, internal combustion engine 10 will continue to maintain the rotational speed link.

The P components of the two rotational speed controllers 62, 64 correspond in their effect to rotational speed-proportional mechanical dampers, and thus counteract torsional vibrations of the units, such as are created as a result of torsional vibrations of dual-mass flywheel 14. Using the two secondary speed control loops, the two units, internal combustion engine 10 and electric machine 30, contribute to the active damping of torsional vibration. Intervention in the torque of internal combustion engine can only be made at discrete ignition times, which limits rotational vibration damping using internal combustion engine 10 to low frequencies. On the other hand, in an electric machine 30 developed as a three-phase machine having field-oriented regulation, torque rise times of less than 1 ms may be achieved. The damping of higher frequencies is thus possible in connection with a suitable rotational speed controller 62.

In the exemplary embodiment of FIG. 2, the secondary speed control loops are implemented decentrally in the control units of the individual units (engine control unit 46 and first rectifier inverter 42). The rotational speed loops are not closed via a bus system, and thus there are no corresponding signal propagation delays. High bandwidths may be achieved. For the specification of the setpoint torques and the setpoint rotational speeds by control system 48 to control units 42, 44, 46 that are assigned to the units, a bus system 56 is used which is usually already present in modern motor vehicles.

In addition, it is of advantage for control system 48 also to specify the control parameters of the secondary speed control loops and the initialization of the integral-action component, whereby the control response and the active torsional vibration damping are able to be adapted to the operating state of the power train, so as, for example, to regard and to optimize internal combustion engine starts and internal combustion engine stops, in which a resonant frequency impressed by dual-mass flywheel 14 is passed through, as separate, without changing the controller structure.

In most operating states of the transmission, one electric machine 30 or 36 works as a motor, and the other, 36 or 30 as a generator. By suitable specification of controller parameters adapted to the operating state, the effects of controller interventions on the electrical power fed into the vehicle's electrical system can be minimized.

At a specified vehicle speed and therefore a defined actual rotational speed $n_{AWactual}$ at transmission output shaft 38, one rotational speed degree of freedom is present in transmission 18. If there is a risk of stressing the system using three speed control loops, for example as a consequence of inaccuracies or time delays in sensing rotation speeds, bandpass filters can be provided on one or two rotation speed control loops before or after rotational speed controller 62, which limit the controller intervention to the frequency range of the undesired power train torsional vibrations. If threatening actuating variable limitations or large system deviations appear imminent, control system 48 should cancel the effect of the bandpass filters so that both the units, internal combustion engine 10 and electric machine 30 are able to be utilized to maintain the rotational speed link.

What is claimed is:

1. A method for operating a power-branching hybrid drive of a vehicle having a first electric machine, a second electric machine and an internal combustion engine outputting a torque, wherein the first and second electric machines are coupled via a transmission, the method comprising:
   connecting drives of the internal combustion engine, the first electric machine and the second electric machine;
   at least intermittently controlling a) operation of the first electric machine by rotation-speed regulation and b) operation of the second electric machine by torque regulation;
   controlling operation of the internal combustion engine by rotation-speed regulation; and
   performing, based on a first system deviation between a setpoint rotation speed and an actual rotation speed of the internal combustion engine, a torque intervention in the internal combustion engine,
   wherein the setpoint rotation speed of the internal combustion engine is specified, and a setpoint rotation speed of the first electric machine is calculated based on the setpoint rotation speed of the internal combustion engine.

2. The method as recited in claim 1, wherein a rotation speed of the second electric machine is coupled directly to the vehicle speed.

3. The method as recited in claim 1, wherein a setpoint torque of the internal combustion engine, a setpoint torque of the first electric machine, and a setpoint torque of the second electric machine are specified.

4. The method as recited in claim 3, wherein the setpoint torque of the internal combustion engine and the setpoint torque of the first electric machine are used for precontrol of the rotation-speed regulation of the internal combustion engine and the rotation-speed regulation of the first electric machine.

5. The method as recited in claim 3, wherein the setpoint torque of the internal combustion engine and the setpoint torque of the first electric machine are ascertained from the setpoint rotation speed of the internal combustion engine, a setpoint rotation speed of the first electric machine, the actual rotation speeds of the internal combustion engine, and an actual rotation speed of the first electric machine.

6. The method as recited in claim 3, wherein the setpoint torque of the internal combustion engine lies within maximum torque limits of the internal combustion engine, and wherein the setpoint torque of the first electric machine lies within maximum torque limits of the internal combustion engine.

7. The method as recited in claim 3, wherein a first rotation speed controller compares the setpoint rotation speed of the internal combustion engine to the actual rotation speed of the internal combustion engine to calculate the first system deviation, and wherein a second rotation speed controller compares a setpoint rotation speed of the first electric machine to an actual rotation speed of the first electric machine to calculate a second system deviation, and wherein the first rotation speed controller calculates an additional torque for the internal combustion engine based on the first system deviation, and wherein the second rotation speed controller calculates an additional torque for the first electric machine based on the second system deviation.

8. The method as recited in claim 3, wherein an integral-action component of a first controller is utilized for the rotation-speed regulation of the internal combustion engine.

9. The method as recited in claim 8, wherein a proportional-action component of a second controller is utilized for the rotation-speed regulation of the first electric machine.

10. The method as recited in claim 9, wherein a proportional-action component of the first controller and the proportional-action component of the second controller are utilized for damping of torsional vibrations.

11. The method as recited in claim 9, wherein a control system specifies at least one of a) control parameters of the integral-action component of the first controller, and b) initialization of the integral-action component of the first controller.

12. The method as recited in claim 9, wherein an intervention by the first and second controllers in a frequency range of undesired power-train torsional vibrations is limited by a bandpass filter.

13. The method as recited in claim 3, wherein control loops for the rotation-speed regulations of the internal combustion engine and the first electric machine are implemented decentrally in two control units assigned to the internal combustion engine and the first electric machine.

14. A method for operating a power-branching hybrid drive of a vehicle having a first electric machine, a second electric machine and an internal combustion engine outputting a torque, wherein the first and second electric machines are coupled via a transmission, the method comprising:
   connecting drives of the internal combustion engine, the first electric machine and the second electric machine;
   at least intermittently controlling a) operation of the first electric machine by rotation-speed regulation and b) operation of the second electric machine by torque regulation;
   controlling operation of the internal combustion engine by rotation-speed regulation; and
   performing, based on a first system deviation between a setpoint rotation speed and an actual rotation speed of the internal combustion engine, a torque intervention in the internal combustion engine,
   wherein a setpoint torque of the internal combustion engine, a setpoint torque of the first electric machine, and a setpoint torque of the second electric machine are specified, and
   wherein the setpoint torque of the internal combustion engine and the setpoint torque of the first electric machine are used for precontrol of the rotation-speed regulation of the internal combustion engine and the rotation-speed regulation of the first electric machine.

15. A method for operating a power-branching hybrid drive of a vehicle having a first electric machine, a second electric machine and an internal combustion engine outputting a torque, wherein the first and second electric machines are coupled via a transmission, the method comprising:
   connecting drives of the internal combustion engine, the first electric machine and the second electric machine;
   at least intermittently controlling a) operation of the first electric machine by rotation-speed regulation and b) operation of the second electric machine by torque regulation;
   controlling operation of the internal combustion engine by rotation-speed regulation; and
   performing, based on a first system deviation between a setpoint rotation speed and an actual rotation speed of the internal combustion engine, a torque intervention in the internal combustion engine,
   wherein a setpoint torque of the internal combustion engine, a setpoint torque of the first electric machine, and a setpoint torque of the second electric machine are specified, and
   wherein the setpoint torque of the internal combustion engine lies within maximum torque limits of the internal combustion engine, and wherein the setpoint torque of the first electric machine lies within maximum torque limits of the internal combustion engine.

16. A method for operating a power-branching hybrid drive of a vehicle having a first electric machine, a second electric machine and an internal combustion engine outputting a torque, wherein the first and second electric machines are coupled via a transmission, the method comprising:
- connecting drives of the internal combustion engine, the first electric machine and the second electric machine;
- at least intermittently controlling a) operation of the first electric machine by rotation-speed regulation and b) operation of the second electric machine by torque regulation;
- controlling operation of the internal combustion engine by rotation-speed regulation; and
- performing, based on a first system deviation between a setpoint rotation speed and an actual rotation speed of the internal combustion engine, a torque intervention in the internal combustion engine,
- wherein a setpoint torque of the internal combustion engine, a setpoint torque of the first electric machine, and a setpoint torque of the second electric machine are specified,
- wherein an integral-action component of a first controller is utilized for the rotation-speed regulation of the internal combustion engine, and
- wherein a proportional-action component of a second controller is utilized for the rotation-speed regulation of the first electric machine.

17. The method as recited in claim 16, wherein a proportional-action component of the first controller and the proportional-action component of the second controller are utilized for damping of torsional vibrations.

18. The method as recited in claim 16, wherein a control system specifies at least one of a) control parameters of the integral-action component of the first controller, and b) initialization of the integral-action component of the first controller.

19. The method as recited in claim 16, wherein an intervention by the first and second controllers in a frequency range of undesired power-train torsional vibrations is limited by a bandpass filter.

* * * * *